(12) United States Patent
Prior et al.

(10) Patent No.: US 8,113,183 B2
(45) Date of Patent: Feb. 14, 2012

(54) ENGINE AND SUPERCHARGER WITH LIQUID COOLED HOUSINGS

(75) Inventors: Gregory P. Prior, Birmingham, MI (US); Roxann M. Bittner, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 762 days.

(21) Appl. No.: 12/178,680

(22) Filed: Jul. 24, 2008

(65) Prior Publication Data

US 2010/0018509 A1    Jan. 28, 2010

(51) Int. Cl.
*F02B 33/00* (2006.01)
*F01C 21/06* (2006.01)

(52) U.S. Cl. ............ 123/559.1; 418/85; 418/96; 418/99

(58) Field of Classification Search ............... 123/559.1; 418/85, 91, 94, 96, 99, 201.1, 206.1, 206.3
See application file for complete search history.

(56) References Cited

U.S. PATENT DOCUMENTS

| | | | | |
|---|---|---|---|---|
| 2,874,534 | A * | 2/1959 | Canazzi | 123/559.1 |
| 3,129,877 | A * | 4/1964 | Nilsson et al. | 418/99 |
| 6,497,563 | B1 * | 12/2002 | Steffens | 418/201.1 |
| 6,663,366 | B2 * | 12/2003 | Okada et al. | 418/201.1 |
| 6,733,258 | B2 * | 5/2004 | Okada et al. | 418/85 |
| 6,837,195 | B2 * | 1/2005 | Suwazono | 123/559.1 |
| 2009/0004038 | A1 * | 1/2009 | Prior et al. | 418/85 |
| 2010/0054980 | A1 * | 3/2010 | Moens | 418/83 |

FOREIGN PATENT DOCUMENTS

JP          03233136 A  * 10/1991

* cited by examiner

*Primary Examiner* — Mary A Davis
(74) *Attorney, Agent, or Firm* — Quinn Law Group, PLLC

(57) ABSTRACT

The present invention reduces the overheating of sealed oil gear cases and excessive charge air temperatures at high engine speeds in automotive supercharger use by providing liquid cooling of one or more of the housings of a supercharger. Cooling the front cover of the supercharger will reduce the gear case temperatures under boost. Cooling the bearing housing will also reduce gear case temperatures in the adjacent gear case. Cooling the rotor housing, in combination with cooling of the rotors by a separate system, will maintain more uniform clearances under continuous boost, as with racing and autobahn applications. Cooling may be by traditional liquid coolant or with oil, and with separate or combined systems. The invention discloses liquid coolant systems for controlling sealed gear case lubricant temperatures as well as supercharger charge air temperatures if desired. Combined coolant handling and flow systems and their advantages are also disclosed. An exemplary engine-supercharger combination is described and illustrated.

10 Claims, 5 Drawing Sheets

ENGINE AND SUPERCHARGER WITH LIQUID COOLED HOUSINGS

TECHNICAL FIELD

This invention relates to engines and positive displacement superchargers, such as roots type or screw compressors utilized for automotive engine superchargers and other purposes.

BACKGROUND OF THE INVENTION

It is known in the art to utilize positive displacement superchargers having coactive rotors for supercharging internal combustion engines and for providing compressed air for other purposes. Such a supercharger may include a housing with a rotor cavity in which a pair of correlated parallel rotors pump air drawn into one end of the housing and discharged through an opening in the cavity wall near an opposite end of the housing. The rotors may be belt driven by the engine through a pulley connected directly, or through a gear train, to the pair of rotors.

Superchargers are very sensitive to running clearances. Tighter clearances between the two rotors and between the rotors and the rotor cavity wall improve flow and efficiency by reducing leakage of hot boost air to the intake side. Problems with scuffing limit the tightest practical operating clearances that are possible. Scuffing is more likely to occur during continuous high load operation from thermal growth resulting from high outlet air temperatures. Rotor fits generally compromise efficiency to maintain clearance and prevent scuffing.

Roots type and screw type compressors used on original equipment automotive engines may be made with a bearing housing between the rotors and the supercharger gear case. This bearing housing is made of aluminum on some commercial superchargers. The aluminum rotors have their air outlet ends rotatably mounted adjacent the bearing housing and are supported and driven through rotor drive stubs extending into the gear case The bearing housing and gear case are sealed by a front cover to form a drive assembly provided with a permanent charge of oil for lubricating the gears and bearings. The gear case has no positive cooling other than ram air in an automotive installation. Hot outlet air under high boost can lead to high gear case temperatures that negatively impact durability.

These and other features and advantages of the invention will be more fully understood from the following description of certain specific embodiments of the invention taken together with the accompanying drawings.

SUMMARY OF THE INVENTION

The present invention reduces the effects of the above-described problems by providing liquid cooling of one or more of the housings of a supercharger. Cooling the front cover of the supercharger will reduce the gear case temperatures under boost. Cooling the bearing housing will also reduce gear case temperatures in the adjacent gear case. Cooling the rotor housing, in combination with cooling of the rotors by a separate system, will maintain more uniform clearances under continuous boost, as with racing and autobahn applications. Cooling may be by traditional liquid coolant or with oil, and with separate or combined systems.

The invention discloses liquid coolant systems for controlling sealed gear case lubricant temperatures as well as supercharger charge air temperature temperatures if desired. Combined coolant handling and flow systems and their advantages are also disclosed. An exemplary engine driven supercharger arrangement is also set forth.

These and other features and advantages of the invention will be more fully understood from the following description of certain specific embodiments of the invention taken together with the accompanying drawings.

DESCRIPTION OF AN EXEMPLARY EMBODIMENT

Figure 1:
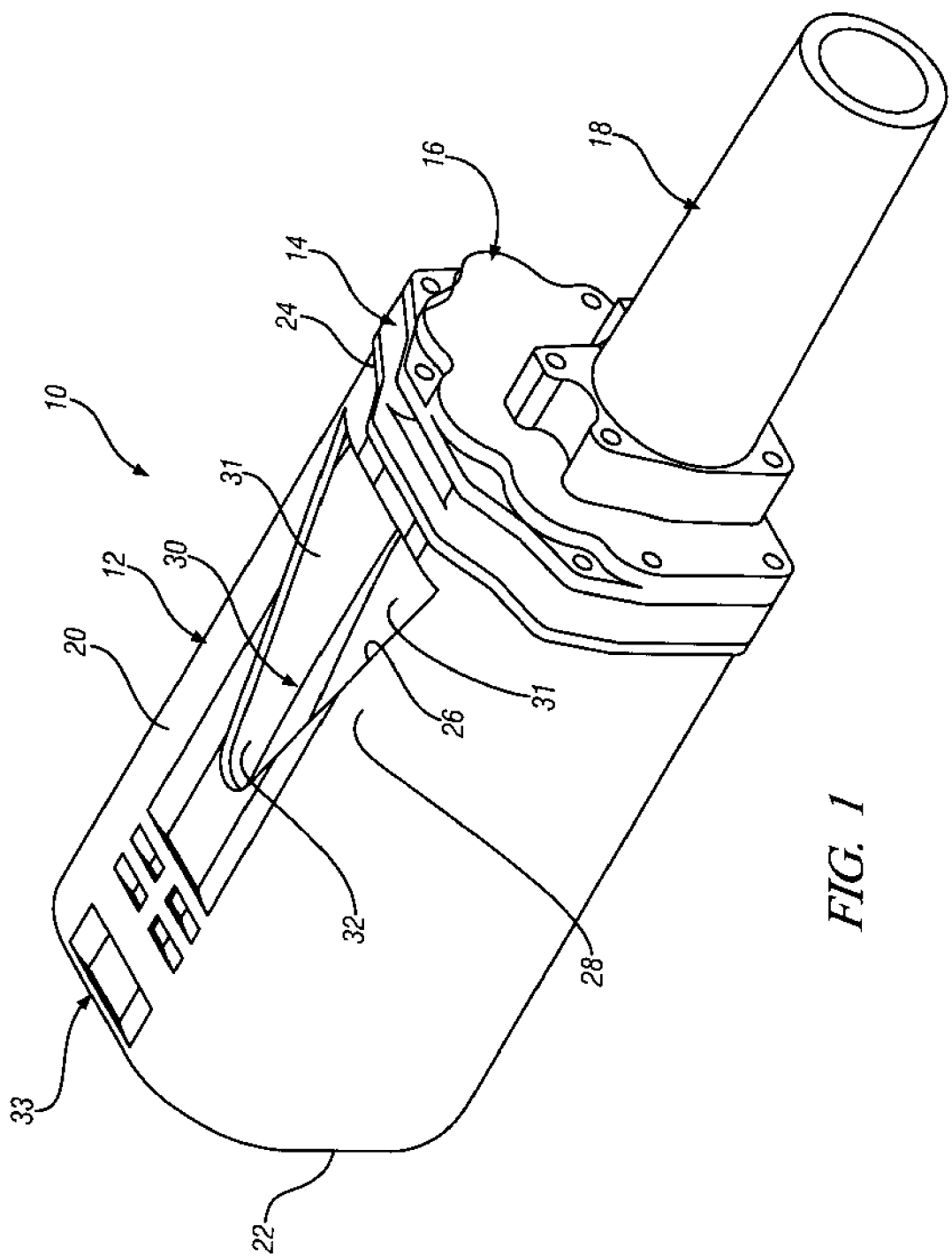
FIG. 1 is a simplified external pictorial view of a supercharger according to the invention.

Referring first to FIG. 1 of the drawings, numeral 10 generally indicates an exemplary roots type positive displacement supercharger in accordance with the present invention. The supercharger comprises a rotor housing assembly 12, a bearing plate 14, partially enclosing a gear case 15, connected to the rotor housing and a front cover 16 closing the gear case and including a tubular drive shaft extension 18. The housing assembly 12 includes a rotor housing 20 having a rear air inlet end 22 and a front air outlet end 24. A triangular outlet opening 26 through an upper wall 28 of the housing provides a view of a pair of coactive positive displacement lobed rotors 30 having lobes 31 rotatable within an internal rotor cavity 32. The cavity is open at the inlet end through an air inlet opening 33 in the rear end 22 of the housing.

Figure 2:
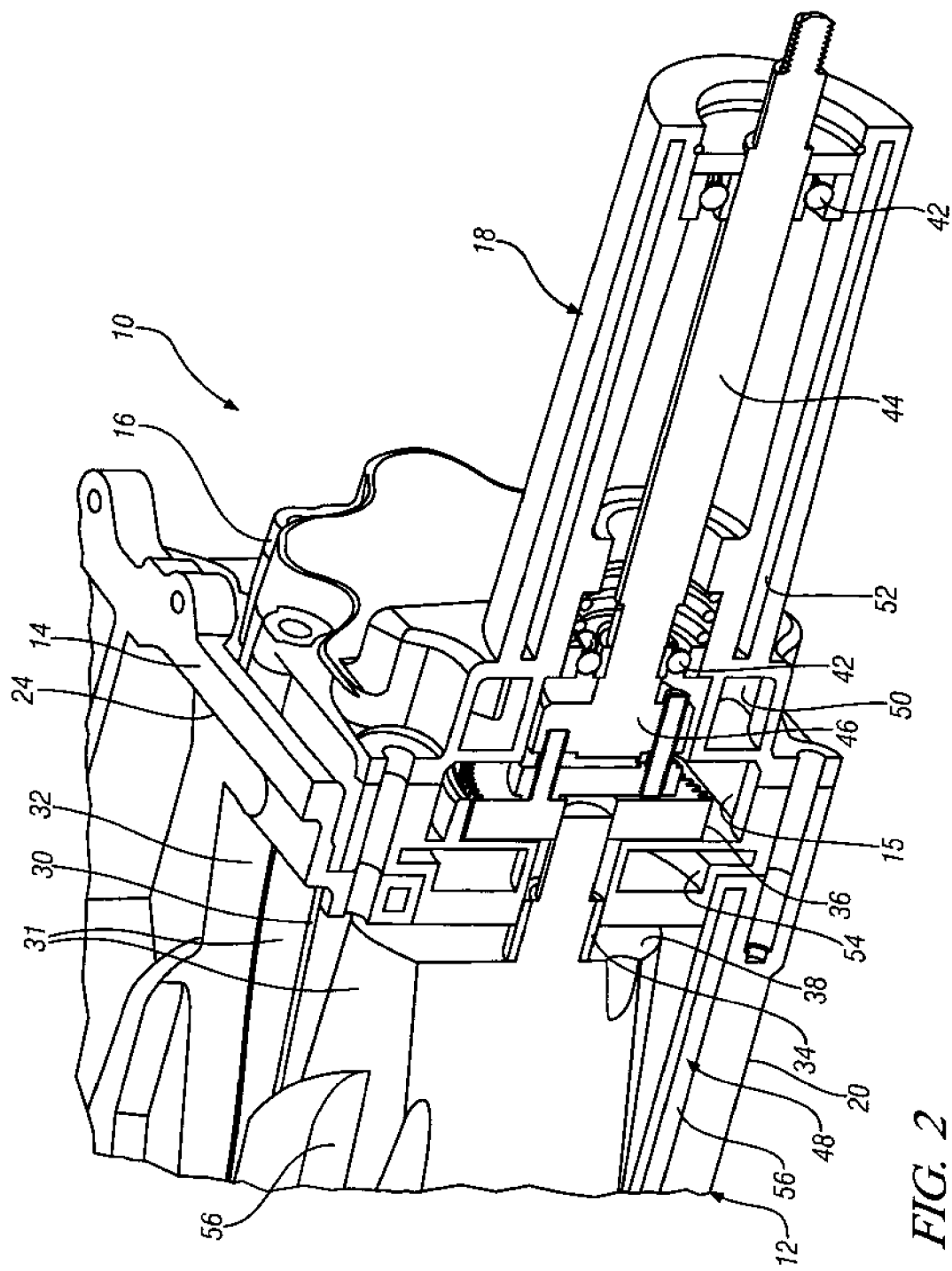
FIG. 2 is a pictorial view of the air outlet end of the supercharger with portions cut away to show internal operating mechanisms and a liquid coolant jacket for the mechanisms and a sealed oil gear case.

FIG. 2 illustrates a front end of the supercharger 10 with portions of the rotor housing assembly 12 cut away to reveal internal components and features. The rotors 30 draw in air through the inlet opening 33 in the rear end 22 of the housing and discharge the air through the outlet opening 26 adjacent the front end 24 of the housing. The bearing plate 14 closes the rotor cavity 32 at the front end 24 of the housing and supports the front rotor bearings 34 as well as carrying timing gears 36 connected to the rotors 30 and contained in the gear case 15 partially formed by the bearing plate.

Front outlet ends 38 of the rotors rotate opposite the bearing plate 14 and maintain desired clearances to avoid scuffing. Similar clearances are maintained at rear ends of the rotors and housing. Also, to avoid scuffing, clearances are maintained between the lobes 31 of the two rotors 30 and between the rotor lobes 31 and the interior of the rotor cavity 32.

The front cover 16, mounted on the front end of the bearing plate 14, closes the gear case 15 in which a permanent charge of lubricating oil is sealed. The cover 16 also includes the tubular extension 18 containing bearings 42 supporting a drive shaft 44. The drive shaft is connected through a seal and coupling 46 with one of the timing gears 36 for driving the rotors 30.

In accordance with the invention, the rotor housing 20, bearing plate 14, front cover 16 and tubular extension 18 are provided with a liquid coolant jacket generally indicated by numeral 48. Coolant jacket 48 includes coolant passages 50, 52 in the front cover 16 and tubular extension 18, intermediate connecting passages 54 in the bearing plate 14, and connecting housing passages 56 in the rotor housing 20. The passages 50, 52, 54, 56 may be configured as desired in order to provide adequate cooling to the separate components in which they are enclosed. A general indication of the form the connecting cooling system passages may take is illustrated in FIG. 3 of the drawings.

Figure 3:
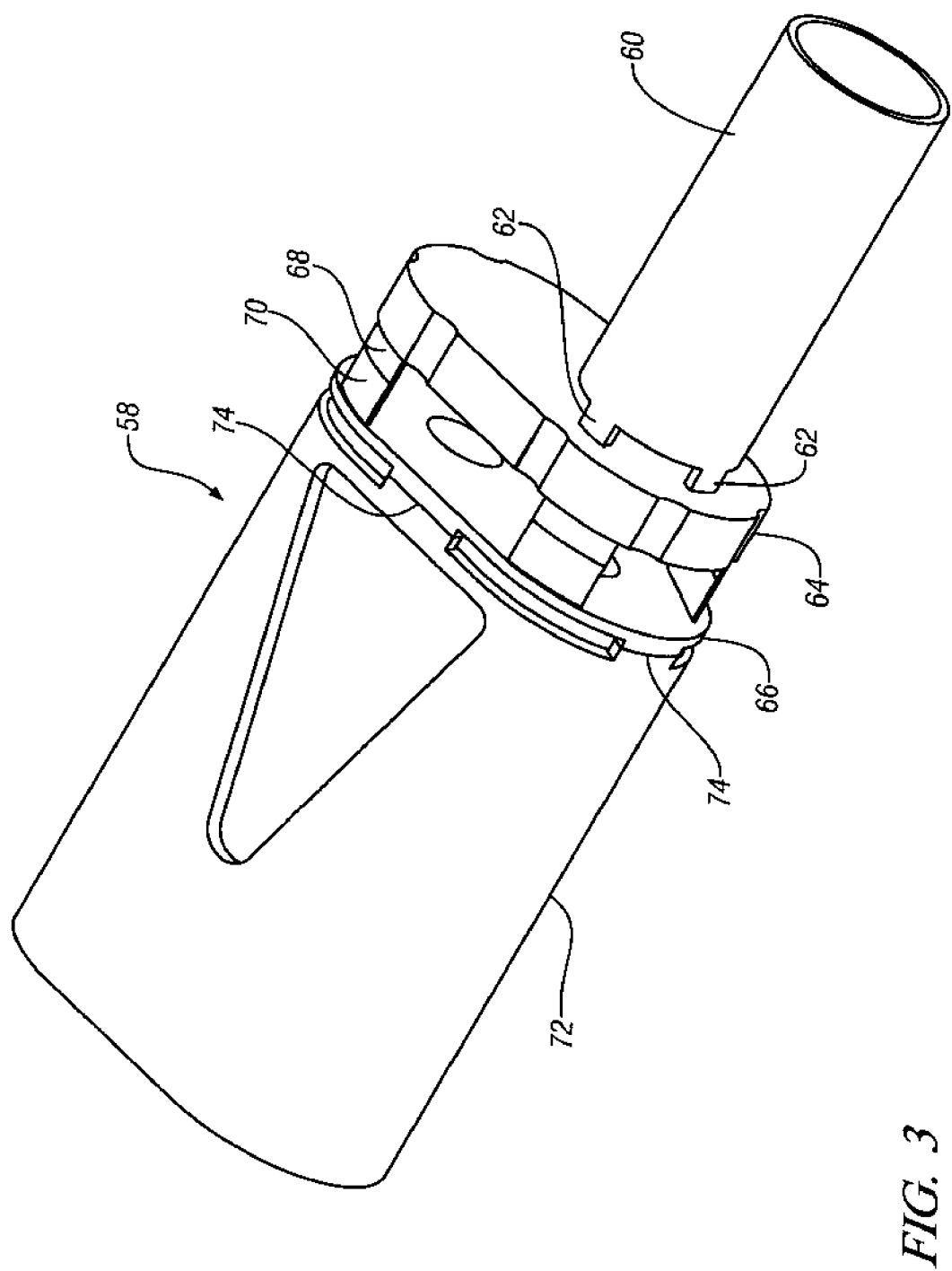
FIG. 3 is a pictorial view of an exemplary core assembly for casting of coolant passages of a coolant jacket within the supercharger.

FIG. 3 illustrates a multi-piece core assembly 58 which could be used in casting the housings of the supercharger for forming the coolant passages of the through flow liquid coolant jacket 48 for cooling some or all of the sections of the coolant jacket.

The core assembly 58 includes four separate cores. A first tubular core 60 forms the tubular coolant passages 52 in the tubular cover extension 18 surrounding the rotor drive shaft and its bearings. The passages 52 could form a tubular cavity or could define tubular quadrants separated by longitudinal separators between annular headers at opposite ends to provide longitudinal flow with a stiffened structure to limit vibration, for example.

The core 60 also includes spaced legs 62 connecting with a flat oblong core 64 for forming the peripheral passages 50 in the cover 16 adjacent to the gear case cavity 15. The legs 62 form flow passages, not shown, between the cover and extension jacket passages 50, 52 for longitudinal coolant flow between them.

A third core 66 forms peripheral passages 54 in the bearing plate around the gear drive shafts between the gear case cavity 15 and the rotor cavity 32. Connecting longitudinal legs 68, 70 are joined to form connecting passages, not shown, between the front cover passages 50 and the bearing plate passages 54.

If used, the fourth core 72 is connected with the third core 66 by angularly spaced connectors 74 forming passages, not shown, between the peripheral passages 54 of the bearing plate and peripheral passages 56 in the rotor housing 20. If desired, the housing passages may be separated into several generally longitudinal flow paths for providing extra cooling in areas of the housing that are exposed to greater heat levels.

Figure 4:
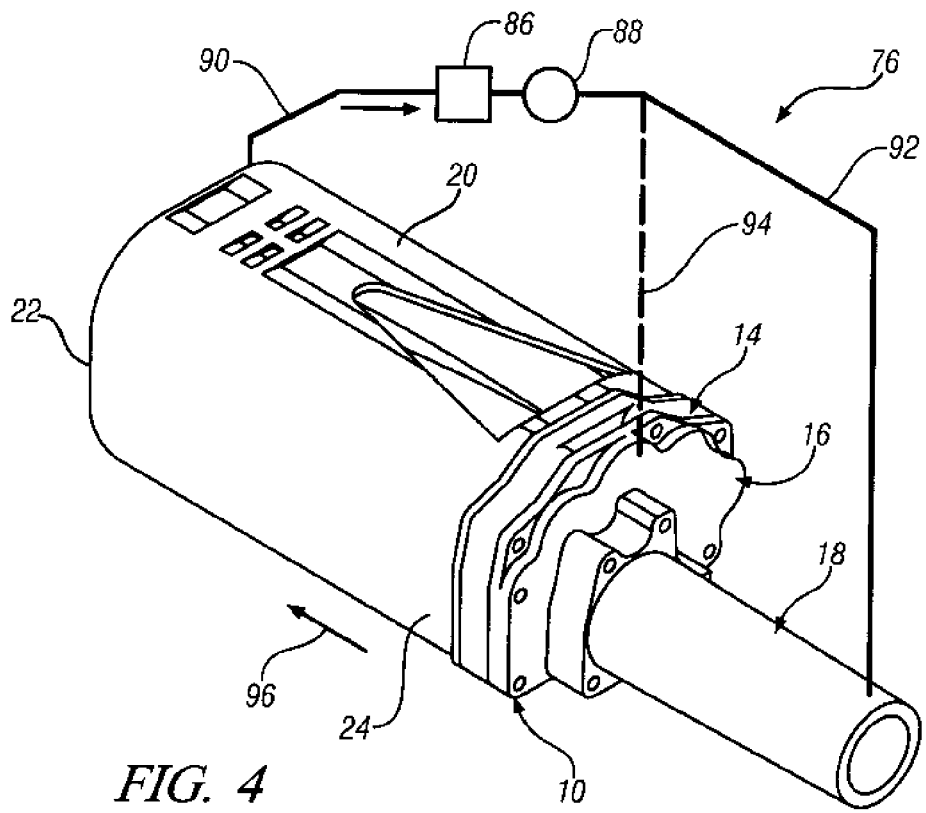
FIG. 4 is a diagrammatic view of the supercharger with a first embodiment of coolant flow system from the front cover to the rotor housing rear end.
Figure 5:
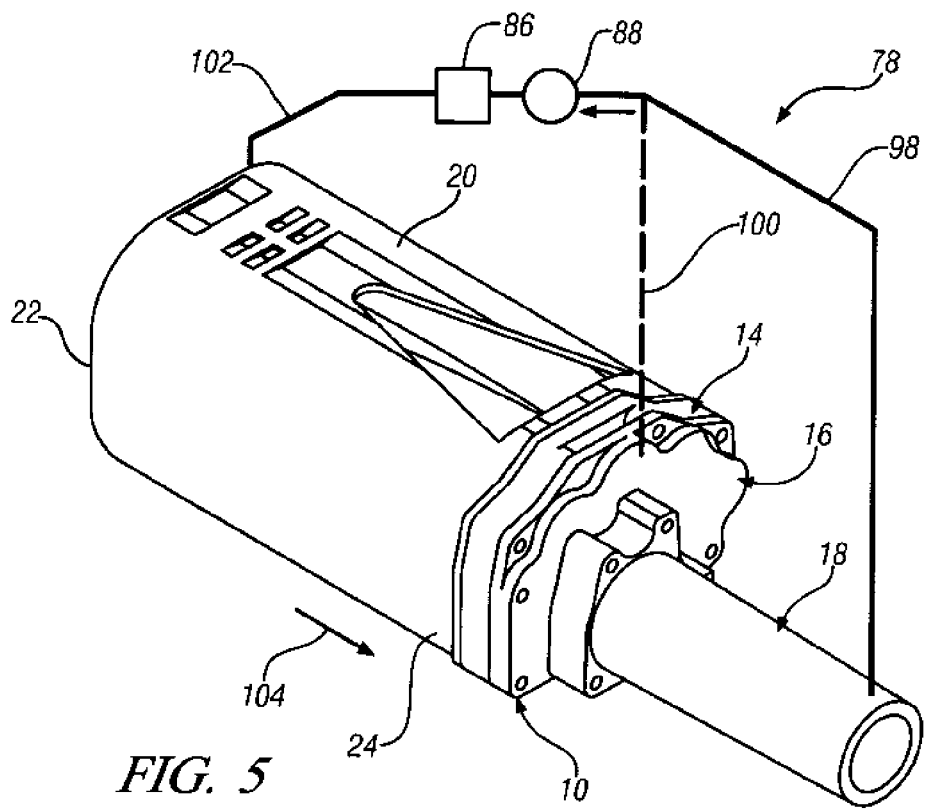
FIG. 5 is a diagrammatic view of the supercharger with a second embodiment of coolant flow system from the rotor housing rear end to the front cover.
Figure 6:
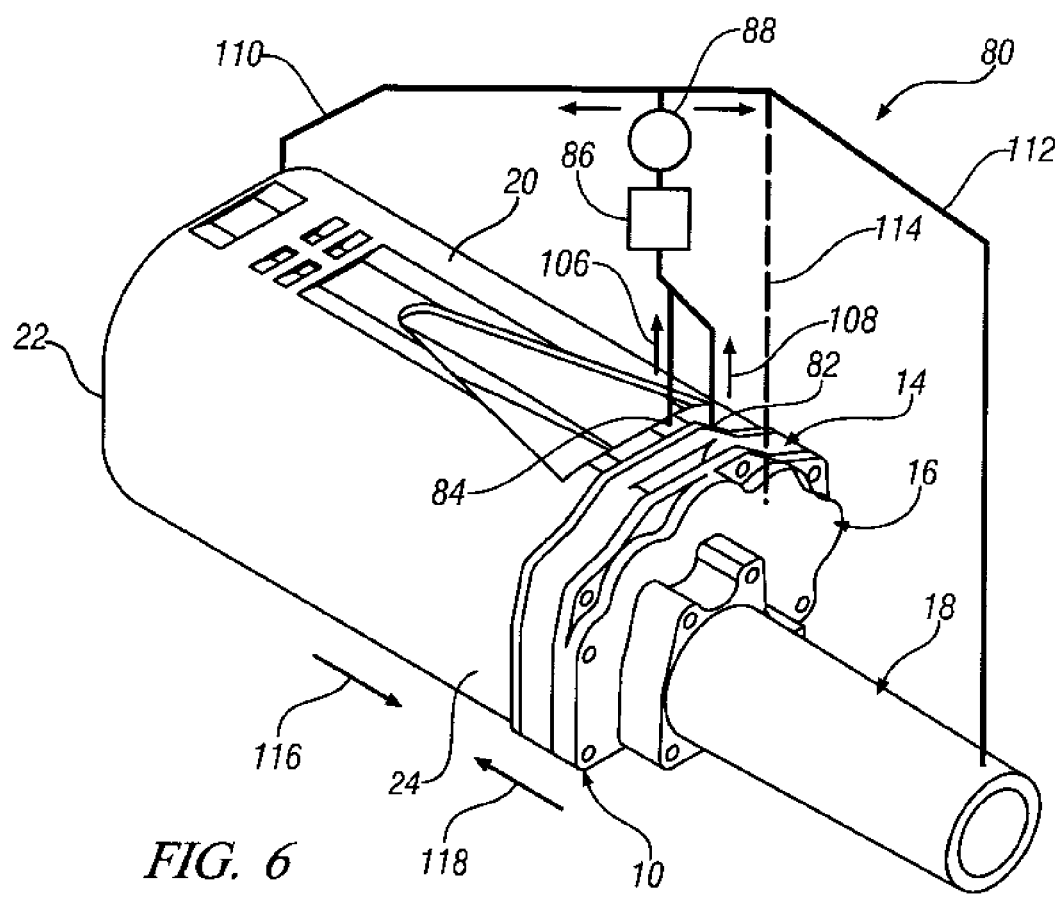
FIG. 6 is a diagrammatic view of the supercharger with a third embodiment having split coolant flow from the inlet to the outlet end of the rotor housing and from the front cover to the bearing plate forming the gear case.

The coolant jacket 48 (FIG. 2) is preferably designed for unidirectional flow from the front cover 16 and extension 18 to the bearing plate 14 and the rotor housing 20 or vice versa. FIGS. 4-6 suggest several alternative embodiments.

To provide maximum cooling to the sealed lubricant in the gear case 15, FIG. 4 shows a first embodiment 76 with an external cooling system, that provides coolant flow first through the cover 16 and bearing plate 14 and second through the rotor housing 20, which would appear to be the best choice. However, to cool the rotor housing 20, while minimizing heating of the charge air entering the rotor cavity 32, FIG. 5 suggests a second embodiment 78. This embodiment includes an external cooling system providing an opposite flow path from the inlet end 22 at the rear of the rotor housing 20 to the outlet end 24 adjacent the bearing plate 14 near the front of the housing 20 and then to the front cover 16 or tubular extension 18.

If desired, a third embodiment 80, shown in FIG. 6, could provide both minimized heating of the charge air and improved cooling of the sealed gear case. A dual flow system would be employed wherein fresh coolant is supplied to both the rear inlet end 22 of the rotor housing and to the front cover 16 or extension 18, passing from the cover to the bearing plate 14. The coolant would be discharged from both an outlet 82 from the bearing plate passages 54 and an outlet 84 from the passages 56 at the outlet end 24 of the rotor housing. Thus, both flow paths would end near the center of the supercharger and the coolant would be returned to a heat exchanger for cooling the heated coolant. In this third embodiment 80, maximum cooling would be supplied to both the charge air in the rotor housing 20 and the lubricant in the sealed gear case 15.

In any of the embodiments suggested, engine coolant could be used in the coolant jacket of the supercharger. However a separate system may be desired to provide lower coolant inlet temperatures for the supercharger.

FIGS. 4-6 illustrate optional external systems for the three embodiments described. In each case, the external system includes a heat exchanger 86 for returning the heated coolant to a desired inlet temperature. A coolant pump 88 then pumps the lower temperature coolant back through the system.

In embodiment 76, (FIG. 4) the coolant passes through outlet line 90 from the rear (air inlet) end of the housing 20 to the heat exchanger 86 and pump 88 and through inlet line 92 to the cover extension 18, or, if desired, through the optional inlet line 94 (dashed) to the main cover 16. Coolant flow direction through the supercharger 10 is indicated by the arrow 96.

In embodiment 78, (FIG. 5) coolant flow is reversed from the outlet line 98 or alternate line 100 (dashed) through the heat exchanger 86 and pump 88 and the inlet line 102 to the rear (air inlet) end of housing 20. Arrow 104 indicates coolant flow direction in supercharger 10

In embodiment 80, (FIG. 6) the flow is split between the coolant outlet line 106 from the coolant outlet 84 at the air outlet end of the housing 20 and the coolant outlet line 108 from the coolant outlet 82 at the bearing plate 14 to the heat exchanger 86 and pump 88 and through inlet line 110 to the air inlet end of the housing 20 and through inlet line 112 to the end of the cover extension 18, or through alternative inlet line 114 (dashed) to the coolant passages of the main cover portion 16. Split coolant flow directions through the supercharger 10 are indicated by the arrows 116, 118. The advantages of these embodiments 76, 78, 80 are described above.

Figure 7:
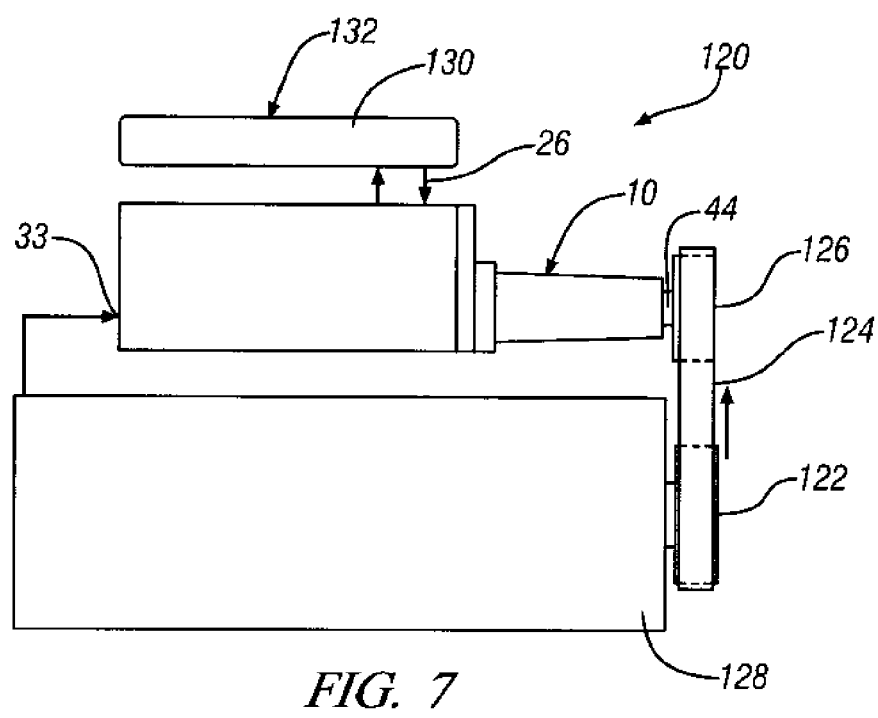
FIG. 7 is a diagrammatic view of an engine drivingly connected with a supercharger according to the invention to supply the engine with pressurized charge air.

FIG. 7 illustrates schematically the manner in which a positive displacement supercharger 10 may be positioned in an engine 120 to supply the engine with compressed charge air delivered to the engine cylinders, not shown. The engine crankshaft, not shown, is provided with an externally mounted drive pulley 122 connected by a drive belt 124 with a driven pulley 126 mounted on the end of the supercharger drive shaft 44. The supercharger may be mounted on top of the cylinder block 128 between cylinder banks, not shown, of a V-type engine 120.

In operation, intake air is drawn into the inlet opening 33 of the supercharger, where it is compressed and discharged from the upper outlet opening 26 into a plenum 130 of an engine intake manifold 132 for delivery to the cylinders, not shown. Because the supercharger 10 is directly driven by the engine 120, the compressed air output varies with the engine rotational speed. The illustrated supercharger arrangement is only one example of arrangements that could be provided for integration of a supercharger 10 with an engine 120 and is not intended to limit the possible applications of the supercharger.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A positive displacement supercharger comprising:
    a rotor housing including a rotor cavity having a surrounding cavity wall;
    a pair of coactive rotors rotatable in the rotor cavity and correlated to carry air axially from an inlet end of the cavity to an outlet near an outlet end of the cavity for discharge at an elevated temperature;
    a gear case formed at one end of the rotor housing between a bearing plate and a front cover, the gear case containing a pair of engaged timing gears connected with the pair of coactive rotors for timed rotation thereof, the gear case adapted to contain a permanent charge of lubricating oil for lubricating the gears;
    the front cover having a cover portion sealingly closing the gear case for retaining the permanent oil charge therein, and a tubular extension supporting a drive shaft drivingly connected to one of the timing gears for driving the pair of coactive rotors in timed relation; and
    wherein the rotor housing, the bearing plate, the cover portion of the front cover and the tubular extension portion of the front cover each define at least one internal cooling passage in fluid communication with each other to define a coolant jacket for carrying liquid coolant in heat exchange relation with the housing, the bearing plate and the front cover for carrying away excess heat therefrom.

2. A supercharger as in claim 1 wherein the front cover includes the cover portion closing an outer end of the gear case and the tubular extension surrounding the drive shaft and the coolant jacket extends through connecting passages between the cover portion and the tubular extension.

3. A supercharger as in claim 2 including an external cooling system directing coolant flow through the coolant jacket from the air inlet end at the rear of the rotor housing through the bearing plate to the front cover.

4. A supercharger as in claim 3 wherein coolant flow in the front cover extends farther to the front cover extension.

5. A supercharger as in claim 2 including an external cooling system dividing coolant flow through the coolant jacket partly from the front cover through the bearing plate and partly through the air inlet end at the rear of the rotor housing to the air outlet end at the front of the rotor housing.

6. A supercharger as in claim 5 wherein coolant flow in the front cover extends farther to the front cover extension.

7. A supercharger as in claim 1 including an external cooling system directing coolant flow through the coolant jacket in a direction from the front cover through the bearing plate to the air inlet end at the rear of the rotor housing.

8. A supercharger as in claim 7 wherein coolant flow in the front cover extends farther from the front cover extension.

9. A supercharger as in claim 1 wherein the rotors are coactive positive displacement rotors oppositely rotatable in the rotor cavity and have correlated interleaved lobes operative to carry the air from the inlet end to the outlet of the cavity.

10. An engine drivingly connected to a positive displacement supercharger for operating the supercharger to supply pressurized charge air to the engine, the supercharger comprising:
    a rotor housing including a rotor cavity having a surrounding cavity wall;
    a pair of coactive rotors rotatable in the rotor cavity and correlated to carry air axially from an inlet end of the cavity to an outlet near an outlet end of the cavity for discharge at an elevated temperature;
    a gear case formed at one end of the rotor housing between a bearing plate and a front cover, the gear case containing a pair of engaged timing gears connected with the pair of coactive rotors for timed rotation thereof, the gear case adapted to contain a permanent charge of lubricating oil for lubricating the gears;
    the front cover having a cover portion sealingly closing the gear case for retaining the permanent oil charge therein, and a tubular extension supporting a drive shaft drivingly connected to one of the timing gears for driving the pair of coactive rotors in timed relation;
    wherein the housing, the bearing plate, the cover portion of the front cover and the tubular extension of the front cover each define at least one internal cooling passage in fluid communication with each other to define a coolant jacket for carrying liquid coolant in heat exchange relation with the housing, the bearing plate and the front cover for carrying away excess heat therefrom; and
    an external cooling system directing coolant flow through the coolant jacket in a direction from the tubular extension of the front cover, through the bearing plate, and toward the air inlet end at the rear of the rotor housing.

* * * * *